J. C. DEUCHLER.
LOCK NUT.
APPLICATION FILED SEPT. 8, 1915.
1,171,105.
Patented Feb. 8, 1916.
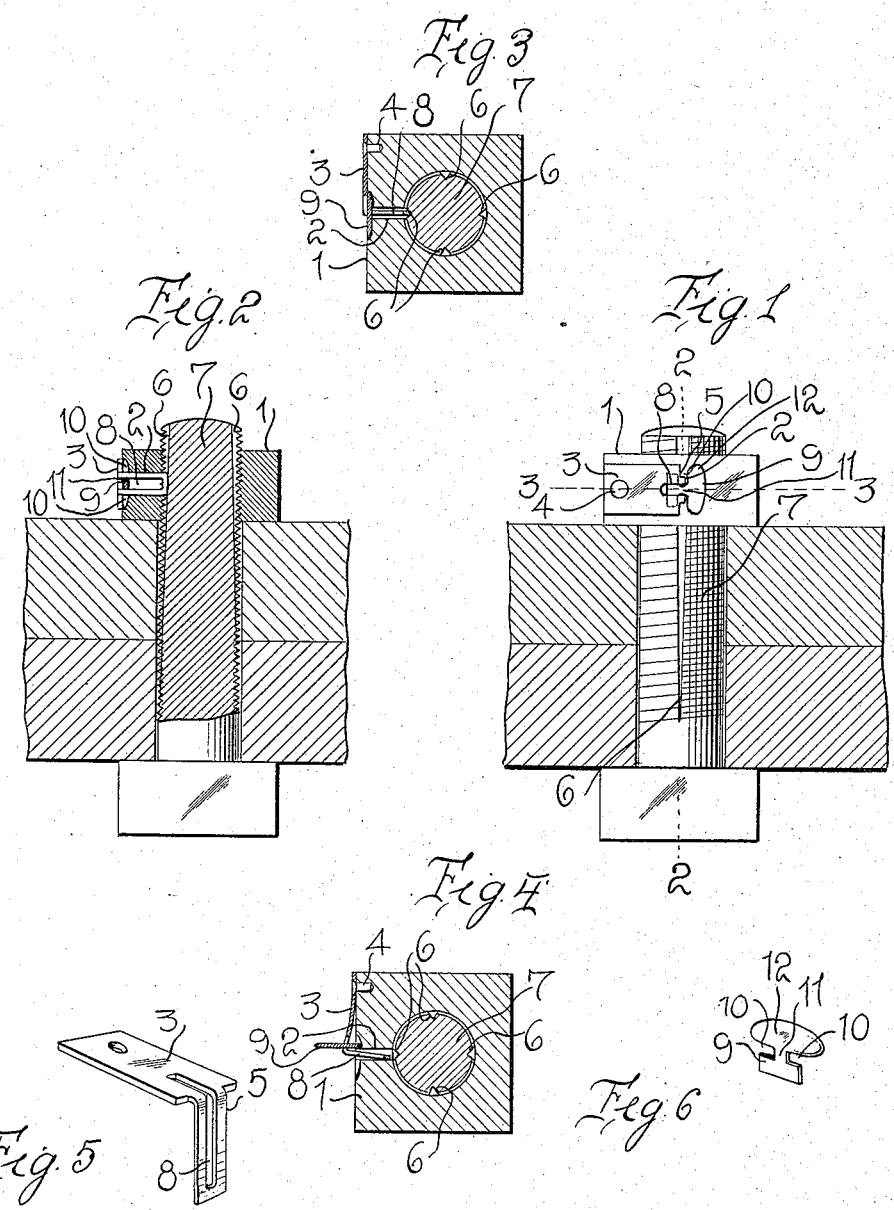
Inventor
JOHN C. DEUCHLER
By Watson E. Coleman
Attorney

UNITED STATES PATENT OFFICE.

JOHN C. DEUCHLER, OF TIFFIN, OHIO.

LOCK-NUT.

1,171,105. Specification of Letters Patent. Patented Feb. 8, 1916.

Application filed September 8, 1915. Serial No. 49,474.

*To all whom it may concern:*

Be it known that I, JOHN C. DEUCHLER, a citizen of the United States, residing at Tiffin, in the county of Seneca and State of Ohio, have invented certain new and useful Improvements in Lock-Nuts, of which the following is a specification, reference being had to the accompanying drawings.

This invention has for its primary object a simple, durable and efficient construction of lock nut which may be used with facility in connection with axle spindles or bolts generally and which can be very easily manufactured and not liable to get out of order, means being provided whereby the locking spring may be easily held in a retracted or disengaged position so as to release the nut from the bolt and permit the nut to be unscrewed whenever desired.

The invention also aims to generally improve devices of this class so as to render them more useful and commercially desirable.

With these and other objects in view, as will more fully appear as the description proceeds, the invention consists in certain constructions, arrangements and combinations of the parts that I shall hereinafter more fully describe and claim.

For a full understanding of the invention, reference is to be had to the following description and accompanying drawing, in which, Figure 1 is a side elevation of a lock nut embodying the improvements of my invention, the same being shown in applied position; Fig. 2 is a longitudinal sectional view of the device, the section being taken substantially on the line 2—2, of Fig. 1; Fig. 3 is a transverse section on the line 3—3, of Fig. 1; Fig. 4 is a similar view to Fig. 3, showing the locking spring in retracted position; Fig. 5 is a detail perspective view of the spring; and Fig. 6 is a similar view of the spring disengaging member.

Corresponding and like parts are referred to in the following description and designated in all of the views of the accompanying drawings by like reference characters.

Referring to the drawings, the numeral 1 designates a nut which may have any desired number of sides and which is formed in one side with an opening 2 extending therethrough into the threads with which the nut is provided.

A plate spring 3 is secured in any desired way, as by a rivet 4 at one end to the apertured side of the nut 1, the other end of said spring being reduced in width, as shown at 5 and angularly disposed so as to project inwardly and through the opening 2, so as to engage with one of the longitudinal grooves 6 that are formed in the threaded portion of the bolt 7. Obviously, there may be any desired number of these grooves within the purview of my invention.

The relatively free end of the locking spring 3 is formed with a slot 8 that extends into the main portion of the spring and also into the angularly disposed locking tongue 5 thereof, and a disengaging member 9 is provided, said member being formed on both sides and intermediate of its ends with recesses 10, which define a relatively short and longitudinally disposed neck 11 received and movable in said slot, said disengaging member being provided outside of the spring, with a finger piece 12, by which it may be manipulated.

From the foregoing description, in connection with the accompanying drawing, the operation of my improved lock nut will be apparent. In the practical use of the device, the disengaging member 9 is turned down flat to its inoperative position, whereby the locking tongue 5 will project into the opening of the nut and as the latter is screwed up on the bolt 7, the locking tongue will snap into the grooves 6 and will prevent any accidental backing off of the nut. Whenever it is desired to unscrew the nut, it is only necessary to catch the finger-piece 12 and turn the disengaging member 9 in a direction to stand it on edge, whereby the spring 3 will be held in an angular position relative to the nut with the locking tongue 5 retracted into the opening 2.

While the accompanying drawing illustrates what I believe to be the preferred embodiment of my invention, it is to be understood that the invention is not limited in this regard, but that various changes may be made in the details of construction, arrangements and proportions of the parts, without departing from the spirit of my invention, as defined in the appended claim.

Having thus described this invention, what I claim is:—

A lock nut provided in one side with an aperture, a plate spring secured at one end to the apertured side of the nut and having its other end disposed angularly and inward through the aperture to form a locking tongue, the spring being formed with a longitudinal slot, and a disengaging member formed intermediate of its ends with a neck movably mounted in said slot and formed at one side of the neck with a finger piece, as and for the purpose set forth.

In testimony whereof I hereunto affix my signature in the presence of two witnesses.

JOHN C. DEUCHLER.

Witnesses:
GEO. E. SCHROTH,
MARK L. LEISTER.

Copies of this patent may be obtained for five cents each, by addressing the "Commissioner of Patents, Washington, D. C."